March 27, 1951 H. W. MARANO Re. 23,349

STAPLE FEED MECHANISM FOR FASTENER APPLYING IMPLEMENTS

Original Filed March 26, 1949 2 Sheets-Sheet 1

Inventor
Herbert W. Marano
Benjamin Schlosser
Atty.

March 27, 1951 H. W. MARANO Re. 23,349

STAPLE FEED MECHANISM FOR FASTENER APPLYING IMPLEMENTS

Original Filed March 26, 1949 2 Sheets-Sheet 2

Inventor,
Herbert W. Marano,
By: Benjamin Schlosser
Attys

Reissued Mar. 27, 1951

Re. 23,349

UNITED STATES PATENT OFFICE 23,349

STAPLE FEED MECHANISM FOR FASTENER APPLYING IMPLEMENTS

Herbert W. Marano, Brooklyn, N. Y., assignor to Wilson-Jones Company, Chicago, Ill., a corporation of Massachusetts Original No. 2,528,444, dated October 31, 1950, Serial No. 83,750, March 26, 1949. Application for reissue December 12, 1950, Serial No. 200,321

3 Claims. (Cl. 1—3)

Matter enclosed in heavy brackets [ ] appears in the original patent but forms no part of this reissue specification; matter printed in italics indicates the additions made by reissue.

This invention relates to a stapling machine, and specifically to a staple slide and its spring for moving the staples along the slide towards the exit channel.

One of the objects of the present invention is to provide means for permitting ready access to the staples mounted on the slide to move them away from the exit channel without dismantling any part of the stapling machine.

Another object of the invention is to provide spring means for feeding the staples forwardly along the staple slide that will require a minimum of space behind the feed plate and will be effective to move the feed plate anywhere along its path of travel.

Other objects of the invention will become apparent upon reading the following description, taken in conjunction with the accompanying drawing in which Figure 1 is a perspective view of a stapling machine of the type for which the staple slide and spring are particularly designed;

Figure 1:
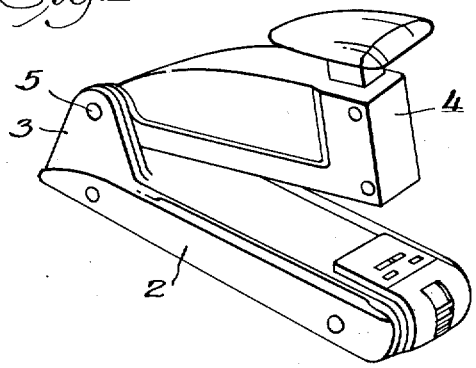

In the drawings, the reference numeral 2 indicates a stapling machine base having upstanding ears 3 at its rear end. A top 4 is pivotally secured to the ears by means of a hinge pin 5. The top 4 is open at its bottom, and a staple slide 6 is mounted therein by the interengagement of flanges 7, extending outwardly from opposite longitudinal sides of the staple slide, and longitudinally extending recesses 8 in the inner surface of each side wall of the top of the stapling machine.

Figure 8:
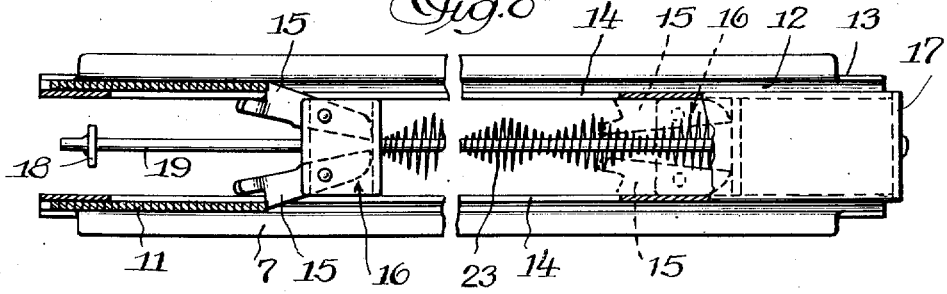
Figure 8 is a top elevation of the staple slide, feed plate, and spring, with parts broken away to facilitate illustration.

The staple slide 6 comprises a top wall 9 and a pair of downwardly extending side walls 10 which are straddled by the legs of wire staples 11. The side walls 10 are each bent outwardly, as indicated at 12, upwardly, as indicated at 13, and then outwardly to form horizontal flanges 7. Each side wall 10 is provided with a longitudinally extending slot 14 through which fingers 15 of feed plate 16 extend to engage the legs of staples 11. The slots 14 stop short of the rear end 17 of the staple slide, so that when feed plate 16 is retracted far enough fingers 15 will engage the ends of slots 14 and will be collapsed into the interior of the staple slide to permit staples fed over the rear end of the staple slide to pass, as shown in dotted lines in Figure 8. A lip 18 extends downwardly from the top wall 9 adjacent its front end and is apertured to receive one end of a guide rod 19, the other end of which is supported by end wall 17. Feed plate 16 is slidably mounted on guide rod 19. A pair of lips 20 is struck downwardly from the top wall 9 rearwardly of the end of slots 14 to stop the rearward movement of the feed plate 16 after fingers 15 have been collapsed into the interior of the staple slide.

Figure 2:
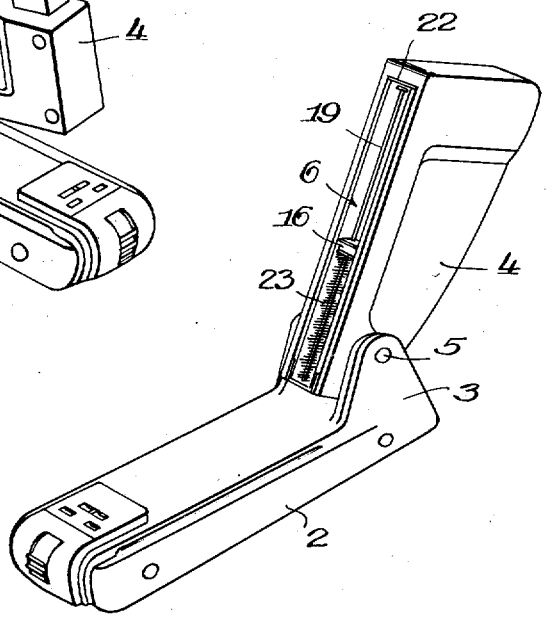
Figure 2 is a perspective view of the stapling machine shown in Figure 1, with the top raised to show the staple slide and spring.
Figure 3:
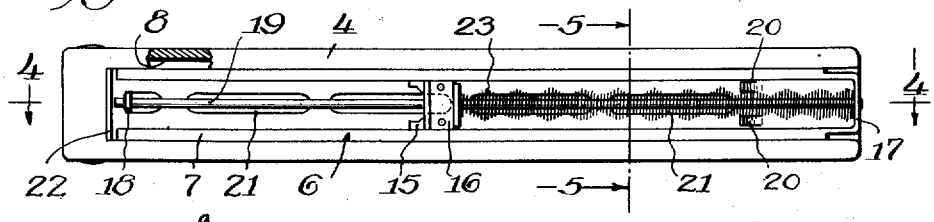
Figure 3 is a bottom plan view of the staple slide with the spring partially compressed.
Figure 4:
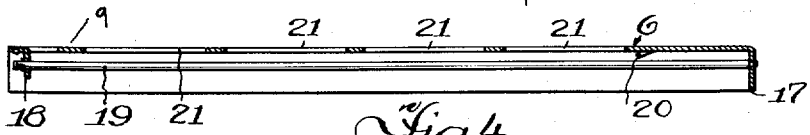
Figure 4 is a longitudinal sectional view, taken along the line 4—4 of Figure 3, with the feed plate and spring omitted to clarify the showing of the staple slide structure.
Figure 5:
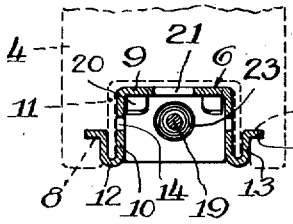
Figure 5 is a cross sectional view, taken along the line 5—5 of Figure 3, showing the staple and the adjacent portion of the top of the stapling machine in dotted lines.
Figure 6:
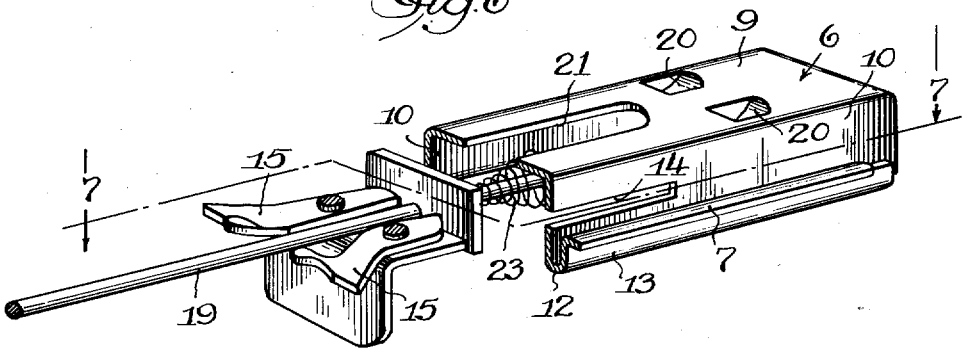
Figure 6 is a fragmentary detail perspective on an enlarged scale showing the feed plate in association with the staple slide and spring, with the staple slide cut away to show the feed plate structure more clearly.
Figure 7:
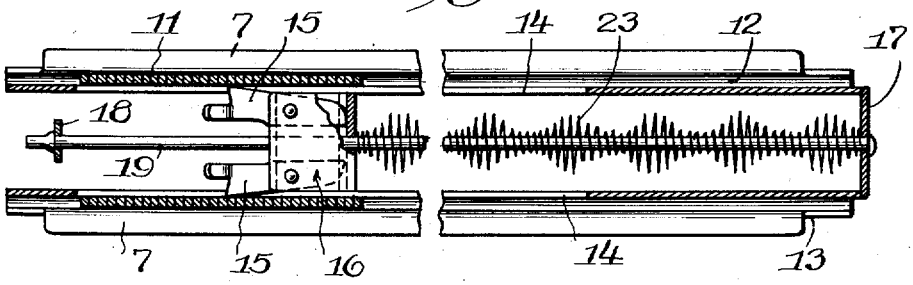
Figure 7 is a longitudinal sectional view, taken along the line 7—7 of Figure 6, but with the staple slide extended and staples positioned on the slide.

Ordinarily, when the feed fingers 15 are collapsed into the interior of the staple slide, any staples on the slide will move backwards under the action of gravity alone if the stapling machine is held with its front end up. However, sometimes staples 11 may be slightly deformed, as for instance by accidentally dropping a heavy object on them before they are positioned in the stapling machine. Such deformation may be so slight that it will not be noticed when the staples are later loaded on the staple slide. Such deformed staples will not feed properly in the stapling machine and will not fall out by gravity when the feed fingers are collapsed. A series of elongated openings 21 is cut out of the top wall 9 of the staple slide to permit ready access to the staples so that if they need to be moved backwards for any reason the stapling machine top may be swung around the pivot 5 to the position shown in Figure 2 and a sharp pointed instrument may be inserted through openings 21 to force the staples away from the exit channel 22 at the forward end of the machine. Openings 21 are wide enough so that the guide rod 19 will not interfere with manipulation of the sharp pointed instrument.

The feed plate 16 is normally urged forwardly by means of a barrel spring 23 encircling guide rod 19 between the feed plate and the end wall 17 of the staple slide. The use of a spring in this relationship is not new, but springs long enough to exert pressure against the feed plate when the feed plate is adjacent the front end of the stapling machine require so much space when compressed that the stapling machine requires considerable extra length to allow for the spring. This problem has been partially solved by Pankonin in Patent No. 2,165,572, issued July 11, 1939, but the double spring structure there disclosed is relatively expensive and difficult to assemble.

As contemplated in the present invention, the barrel spring 23 comprises a continuous series of helical spring sections each of which has half its coils progressively increasing, and the other decreasing in size, as in a spiral. The degree of difference between the diameters of adjacent coils is slightly greater than the thickness of the wire so that the coils in each section may be compressed into a space equal in thickness to twice the thickness of the wire of which the spring is made.

The reduction in the length of the space saved by the use of the barrel spring 23 instead of a conventional helical spring may be expressed by the formula $R=ND-2DS$ where R is the reduction in length, N is the number of coils that would be required in a conventional helical spring to perform the intended function of urging the feed plate forwardly regardless of its position on the staple slide, D is the diameter of wire, and S is the number of sections in the spring.

The compressibility of the spring is of extreme importance because when the staple slide is fully loaded the spring must be contained in the space between the rear of the feed plate and the rear end of the staple slide. When the staple slide is almost empty, the spring must exert enough force against the remaining staples to move them successively into the exit channel. This requirement of force at the front end of the staple slide when most of the staples have been used makes it impractical to use a conventional helical spring because of the large amount of space that would be required behind the feed plate to house the spring when the staple slide is fully loaded.

Although I have described a preferred embodiment of my invention in considerable detail, it will be understood that the description thereof is intended to be illustrative, rather than restrictive, as many details may be modified or changed without departing from the spirit or scope of my invention. The staple slide and barrel spring are particularly designed for use in the stapling machine disclosed in my co-pending application Serial No. 76,497, filed February 15, 1949, but may be used in many other types of stapling machines. Accordingly, I do not desire to be restricted to the exact structure described, except as limited by the appended claims.

I claim:

1. In a stapling machine, a staple slide having a top wall, a guide rod secured beneath said top wall, and a series of longitudinally extending openings extending through said top wall to provide access from the underside of said staple slide to a plurality of staples straddling said slide, said openings being wider than said rod.

2. In a stapling machine, a staple slide having a top wall provided with a longitudinally extending opening whereby access may be had from the underside of said staple slide to a plurality of staples straddling said staple slide, a depending end wall, a feed plate mounted in said staple slide, and a spring mounted in said staple slide between said feed plate and said depending end wall, said spring comprising a plurality of coils of different diameters whereby coils of smaller diameter may be received within adjacent coils of larger diameter when said spring is compressed.

3. *In a stapling machine, a staple-supporting slide, a staple pusher slidably mounted on the slide for reciprocable movement therealong, compression spring means disposed within the slide normally operable to urge the pusher towards one end of the slide, and spring guiding and supporting means within the slide extending lengthwise thereof, the spring encircling the guide means being a continuous integral elongated member and comprising, when expanded a plurality of hour-glass shaped sections, each of which sections has half its convolutions of progressively increasing diameter and the other half of progressively decreasing diameter, and adapted on contraction thereof to have the individual smaller convolutions nest within the adjacent larger convolutions.*

HERBERT W. MARANO.

REFERENCES CITED

The following references are of record in the file of this patent or the original patent:

UNITED STATES PATENTS

| Number | Name | Date |
|---|---|---|
| 274,715 | Buckley | Mar. 27, 1885 |
| 755,729 | White | Mar. 29, 1904 |
| 1,031,090 | Roze | July 2, 1912 |
| 2,309,779 | Maynard | Feb. 2, 1943 |

FOREIGN PATENTS

| Number | Country | Date |
|---|---|---|
| 326,939 | Germany | Aug. 5, 1920 |